United States Patent [19]

Mount

[11] 3,971,085

[45] July 27, 1976

[54] LOCK NUT

[76] Inventor: Wadsworth W. Mount, 154 Mountain Ave., Warren, N.J. 07060

[22] Filed: Apr. 21, 1975

[21] Appl. No.: 569,770

[52] U.S. Cl. ............................. 10/86 A; 151/21 B
[51] Int. Cl.² ........................................ B21D 53/24
[58] Field of Search ............ 10/86 R, 86 A; 85/32 R; 151/21 R, 21 B

[56] References Cited
UNITED STATES PATENTS

| | | | |
|---|---|---|---|
| 426,185 | 4/1890 | Ibbotson | 151/21 B |
| 1,077,023 | 10/1913 | Ward | 151/21 B |
| 1,367,168 | 2/1921 | Stanford | 151/21 B |
| 1,522,565 | 1/1925 | Whitman | 151/21 B |

FOREIGN PATENTS OR APPLICATIONS

| | | | |
|---|---|---|---|
| 607,984 | 4/1926 | France | 151/21 B |
| 1,550,065 | 12/1968 | France | 151/21 B |
| 68,708 | 11/1927 | Sweden | 10/86 A |
| 11,281 | 9/1885 | United Kingdom | 151/21 B |
| 255,308 | 7/1926 | United Kingdom | 151/21 B |

Primary Examiner—Lowell A. Larson
Assistant Examiner—E. M. Combs
Attorney, Agent, or Firm—Cooper, Dunham, Clark, Griffin & Moran

[57] ABSTRACT

A lock nut blank and a method of making a lock nut having a portion only of its threads, and not more than three complete threads, compressed axially and not radially so as to engage a mating bolt with sufficient resilient force to provide substantial torque in opposition to turning of the nut, said torque being substantially constant over the entire range of travel of the nut along the bolt and maintaining the minimum breakaway torque as a substantial proportion of the initial tightening torque, throughout repeated operations, said force being so limited that galling of the thread, nut and screw is prevented. The nut is made by first producing a blank having a body, which in one embodiment is of conventional form, and a relatively thin walled collar connected integrally at one of its ends to an end of the body adjacent the inner periphery thereof. The blank is initially threaded with the same pitch in both the body and the collar. The collar wall thickness has a critical relation to the thread depth and the axial length of the collar has a critical relation to the thread pitch. After the blank is formed within these dimensional limitations, the collar is compressed axially, either by a steady force or by an impact, beyond its elastic limit, so that it is permanently shortened within a controlled tolerance range and the pitch on the threads in the collar is reduced.

One embodiment has an upstanding peripheral shoulder on the blank, shorter than the projecting collar and spaced radially therefrom, and serving as a stop for a compressing tool engaging the end of the collar, so as to limit the compression. The outer periphery of the collar is free of restraint throughout the compression, so that the metal of the collar can flow outwardly. A plurality of nut blanks can be compressed at the same time by a single press or hammer.

5 Claims, 8 Drawing Figures

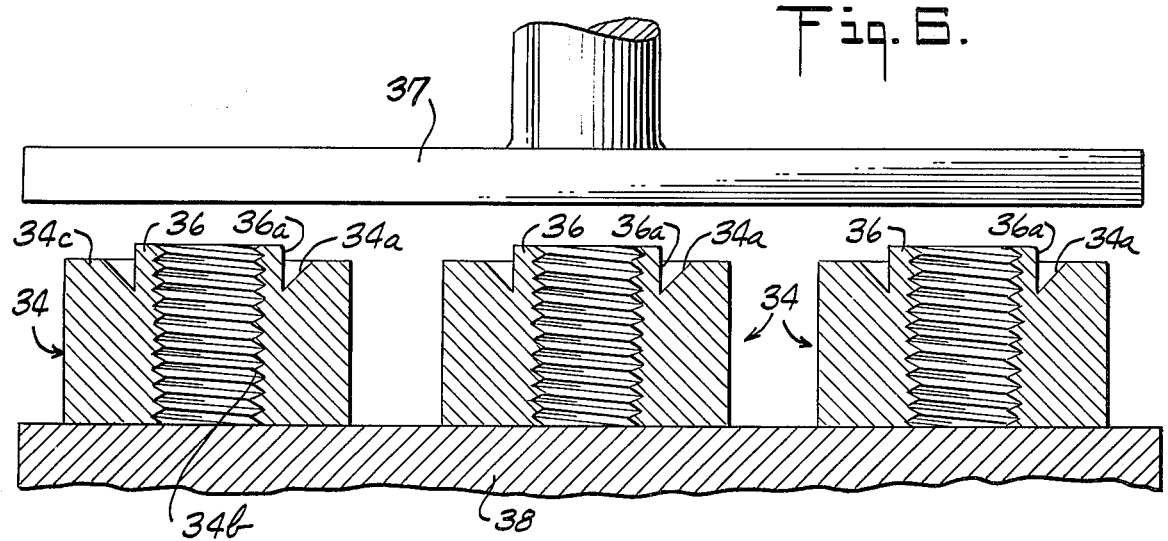
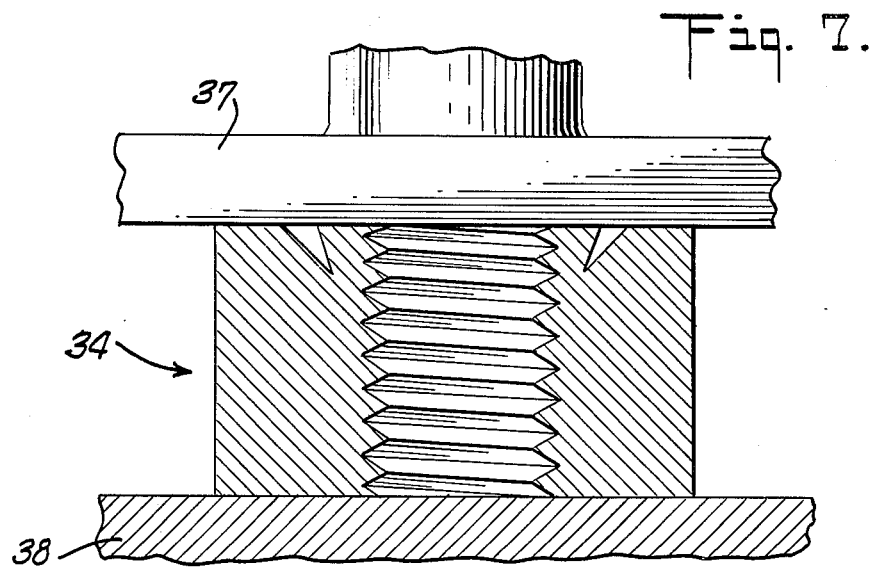
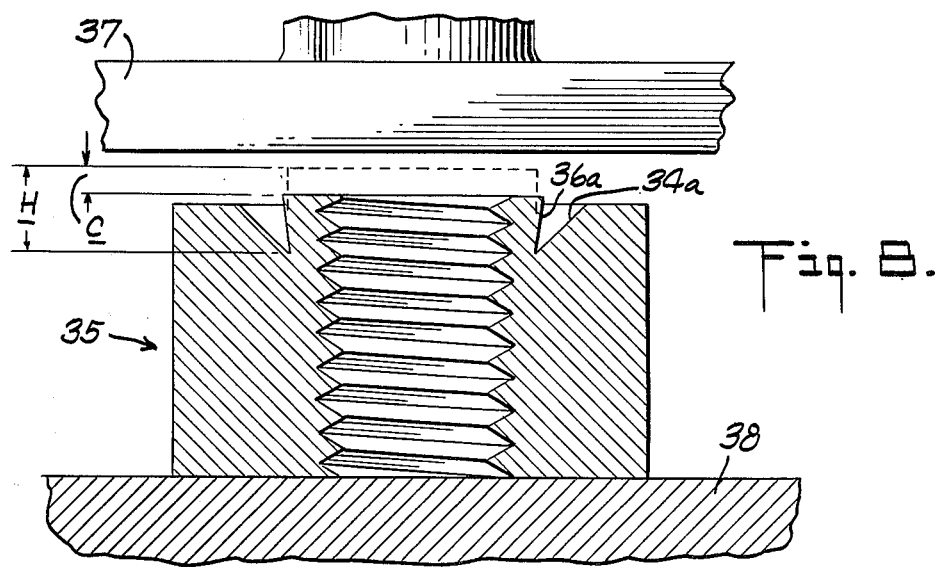

LOCK NUT

BACKGROUND OF THE INVENTION

When fastening articles together by means of screws or bolts, lock nuts are frequently employed to prevent the fastened articles from becoming detached.

The British patent to Ekstrom et al, U.S. Pat. No. 255,308 shows a lock nut having a projecting collar at one end with an internally threaded bore running the full length of the main body and the collar. After the threads are formed, all of the same initial pitch, Ekstrom proposes to compress the collar axially "only to a certain extent, defined by practice", so as to reduce the thread pitch on that portion of the threads within the collar. He has no teaching as to how that "certain extent" may be determined, other than to say that "the clamping action must neither be too strong nor too weak". Neither does he teach any method or means by which the compression may be controlled. Ekstrom does not teach any necessary limitation of the radial thickness of the collar as compared to the depth of the threads. Neither does he teach any necessary limitation of the relationship between the precompression axial length of the collar and the pitch of the threads. Still further, he does not teach any necessary limitation as to the amount of compression of the collar as compared to the initial thread pitch. All of these limitations are critical and failure to observe then accurately results in nuts having undesirable torque characteristics.

Ekstrom et al shows in FIG. 3 a nut having a constant radius collar 2 before axial compression. FIG. 4 shows the same collar, tapered by axial compression, with a thicker wall adjacent the body 1 and a thinner wall at the end remote from the body. The Ekstrom et al disclosure is misleading, in that it is not possible, solely by axial compression of the collar of FIG. 3 to produce the collar shown in FIG. 4. On the contrary, the collar structure shown in FIG. 4 can be produced from the collar of FIG. 3 only by laterally restraining the upper end of the collar from expansion while it is being compressed axially. Die structures for producing such axial compression and lateral restraint are shown in Henderson British Pat. No. 11,281 of 1885 and Robert French Pat. No. 1,550,065.

The French patent of Ekstrom et al, No. 607,984, which corresponds in part to British Pat. No. 255,308, regards the axial compression of threads and the radial compression thereof as mechanical equivalents, as far as their locking function is concerned.

Stanford, U.S. Pat. No. 1,367,168, shows a reduction of pitch of certain threads of a lock nut by deformation under heat.

Many other prevailing torque lock nuts of the prior art have their threads distorted radially and in some cases both axially and radially. Such lock nuts rely on high pressure radial interference contacts between threads. In use, such contact areas may gall the threads on even tear off parts of the threads, so that the holding torque may be lost or possibly increased to the point that the parts may be separated only with difficulty, if at all.

SUMMARY OF THE INVENTION

This invention is concerned with an improved lock nut blank, and a method of making a lock nut from the blank, and the resulting nut. The blank, the method and the nut are all adaptable for mass production.

The method starts with a lock nut blank having a relatively thick walled body and a relatively thin walled collar integrally connected at one of its ends to an end of the body. A continuously threaded bore of constant pitch is provided through both body and collar. The initial axial length of the collar is at least equal to the pitch and no greater than about three times the pitch. The initial thickness of the collar wall is at least equal to about three-fourths of the depth of the thread and no greater than about one and one-half times the depth of the thread. The initial formation and threading of the collar may be carried out on automatic machines, on which these dimensional tolerances may be readily maintained in mass production.

After the collar is initially formed within these dimensional limitations, it is permanently shortened solely by axial compression, without lateral restraint, so as to reduce the thread pitch therein without imposing radial compressive forces. The axial compression may be done either by a steady force or by an impact, and goes beyond the elastic limit of the material, (so that when the compression is relieved, the collar does not return to its original dimensions, but is permanently shortened within a controlled tolerance range and the pitch on the threads in the collar is reduced). The collar material is first stressed in axial comression beyond its elastic limit, and the stress is then relieved so that the collar restores itself part way toward its original dimensions. The difference between the temporary shortening during compression and the lengthening of the collar during this self-restoration determines the permanent shortening of the collar. Since this lengthening of the collar is not directly controlled, it is essential for mass production that the permanent shortening of the collar have a wide tolerance range, within which the torque characteristics of the nut meet the specifications. If the collar is initially formed within the critical dimensional limitations, then acceptable torque characteristics may be secured by shortening the collar from 0.1 to 0.4 times the initial thread pitch. There is thus a wide tolerance range for the shortening operation.

The compression of the collar must be controlled to keep the permanent shortening thereof within the acceptable tolerance range. This control is achieved by (1) controlling the dimensions of the nut blanks; and (2) controlling the stroke of the press or hammer which performs the compression. The control of the stroke may be accomplished, according to one embodiment of the invention, by building into each nut blank a shoulder which serves as a limit stop for the travel of the press or hammer.

If the collar is initially formed and shortened within the critical dimensional relations, then when the bolt is inserted, the threads of the bolt and nut are deformed within their elastic limits, so that after each insertion and withdrawal, the nut and bolt are self-restored substantially to the dimensions existing immediately before the insertion.

DRAWINGS

FIG. 6 is a cross-sectional view showing a compressing apparatus being used to compress plural lock nut blanks according to a different embodiment of the invention.

FIG. 7 is a fragmentary cross-sectional view of the apparatus of FIG. 6 compressing a single blank.

FIG. 8 is a cross-sectional view similar to FIG. 7, showing the apparatus after compression on the blank has been relieved to form a completed nut.

DETAILED DESCRIPTION

Figure 1:
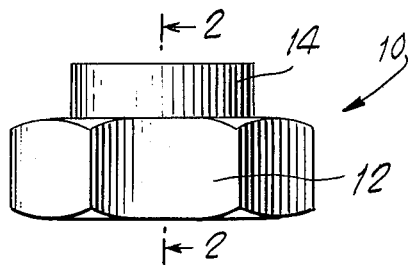
FIG. 1 is a side elevational view of one form of nut blank constructed in accordance with the invention.
Figure 2:
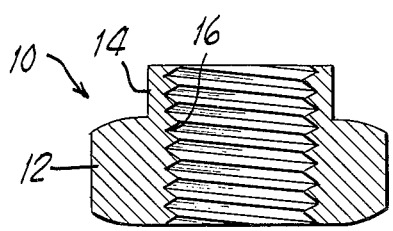
FIG. 2 is a cross-sectional view taken along the line 2—2 of FIG. 1.

FIGS. 1 and 2 show a nut blank 10 having a body 12 and a cylindrical collar 14 integral with the body 12 and projecting upwardly from the upper end of the body. A continuously threaded bore 16 passes through the body and the collar. The pitch of the thread is uniform throughout the length of the bore.

Figure 3:
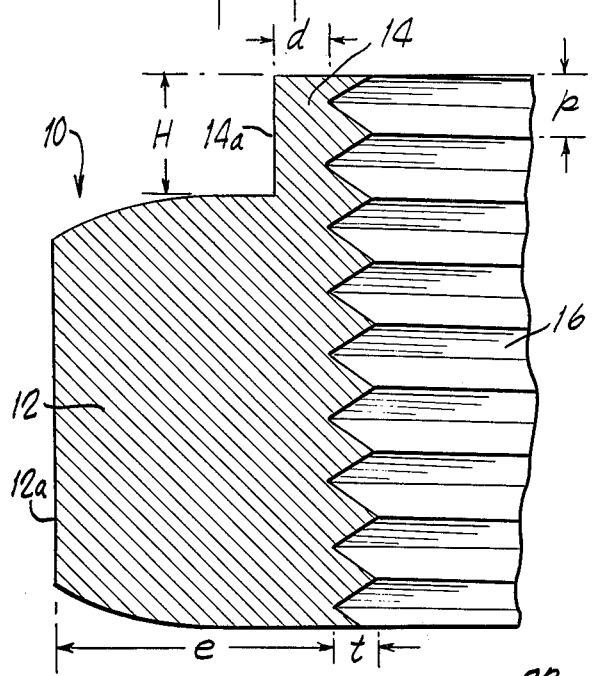
FIG. 3 is an enlarged fragmentary cross-sectional view of the nut blank of FIGS. 1 and 2, before compression of the collar thereof to form a lock nut.

The collar extends a distance H (FIG. 3) above the upper end of the body 12. It is necessary that the distance H, hereinafter termed the collar wall height, is not less than the pitch $p$. The wall thickness $d$ of the collar 14 is the distance between the cylindrical outer surface 14a of the collar 14 and the roots of the threads in the bore 16. The collar wall thickness $d$ must be not less than about three-fourths and not greater than about one and one-half times the thread depth $t$ shown in FIG. 3. Preferably, the collar wall thickness $d$ is equal to the thread depth $t$. The wall thickness of the body 12, as shown in FIG. 3, is designated as $e$. This body wall thickness $e$ is the distance between the center of a flat on the outer surface 12a of the body and the roots of the threads in the bore 16. The body wall thickness $e$ is substantially greater than the collar wall thickness $d$, typically by a factor of two or more.

After the nut blank 10 is formed as described above, it is compressed axially by forces perpendicular to the plane end surfaces, with all lateral surfaces of the collar free from restraint. During this compression, the stress is higher in the collar than in the body 12, because of the smaller volume of material available to resist the stress. The compressive force applied must be sufficient to stress the collar beyond its elastic limit, so that the material of the collar will flow. When this flow takes place, it must move in a lateral direction. Inward flow toward the threaded opening in the nut is resisted by the compressive strength or arch strength of the material. Outward flow is resisted by the hoop strength, which is a tensile strength smaller than the arch strength. Consequently, the material flows outward rather than inward and the diameter of the threaded bore 16 is not reduced.

Figure 4:
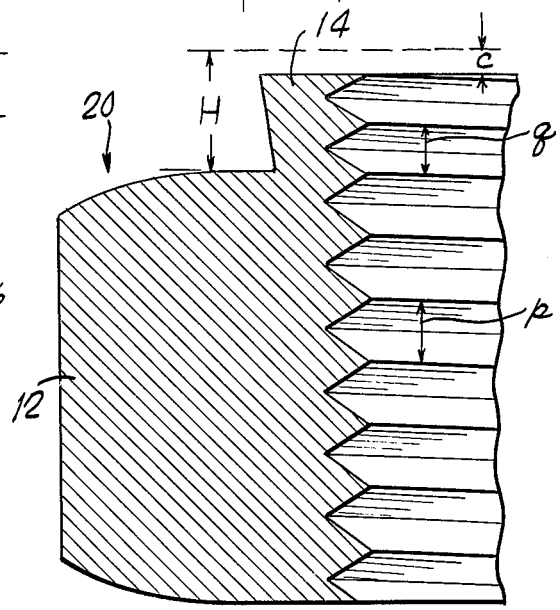
FIG. 4 is a view corresponding to FIG. 3, after compression of the collar to form a lock nut.

At the lower end of the collar 14, the material thereof is held against lateral flow by its integral connection with the more massive body 12, which is not stressed beyond its elastic limit. As the axial distance from the body along the collar increases, the outward flow increases, being greatest at the upper end, as shown in FIG. 4. After the collar has been stressed sufficiently beyond its elastic limit, the stress is relieved, so that the resilience of the material restores the contour part way toward but not all the way to its original position. Hence the collar is shortened by a permanent deformation $c$ (Compare FIGS. 3 and 4). This compression may be carried out either by a steady force or by an impact, and must deform the collar 14 in axial compression, beyond its elastic limit, with a strain great enough so that after the strain is removed, the collar retains the permanent axial deformation $c$. Since the shortening operation involves the response of the metal to a stress beyond its elastic limit, and may also involve an impact, it is highly desirable that a wide range of tolerance be permitted for the shortening $c$. It is necessary to maintain the critical dimensional relations defined above, i.e., (1) the dimensional relation between the collar wall thickness, on the one hand, and the thread depth and body wall thickness, on the other hand; and (2) the dimensional relation between the collar height and the thread pitch. If those dimensional relations are maintained, then the shortening $c$ may vary over a tolerance range from $0.1p$ to $0.4p$.

Since the minimum collar wall height before shortening is $1.0p$, and the maximum shortening is $0.4p$, then the minimum collar wall height after shortening is $1.0p - 0.4p = 0.6p$. Similarly, the maximum collar wall height after shortening is $3.0p - 0.1p = 2.9p$.

After the compression is relieved, the collar 12 is thickened, at its upper end, as may be seen in FIG. 4, so that the peripheral surface of the collar has a reverse taper, with the end nearest the body 12 having the minimum diameter.

If the critical dimensional relations defined above are observed, the shortening is evenly distributed over the length of the collar, due to the thin walled cylindrical shape of the collar 14.

Following compression of the collar 14 of the lock nut, the pitch of the collar threads is reduced from $p$ to $g$. (See FIG. 4). The pitch in the body 12 remains unchanged at $p$. The shortening $c$ of the collar can be adjusted to provide any torque desired between a minimum which is just enough to hold the nut in position on the bolt, and a maximum which will just avoid a galling torque.

The collar height H and the shortening $c$ for a given size and character of nut, may be established as design parameters by the locking torque required for that particular nut. It should be noted that the longer the collar height H, for a given shortening $c$, the lower the loading per unit area on the collar threads. Furthermore, for a given loading per unit thread area, then the longer the height H, the greater the locking torque obtained.

These variables are readily established for each size nut, and once established, these nuts can be readily manufactured by mass production techniques with a great certainty of uniform torquing characteristics.

The reference numeral 20 is applied to the finished nut, after shortening of the collar 14, to distinguish the finished nut from the nut blank 10, before the collar is shortened.

Figure 5:
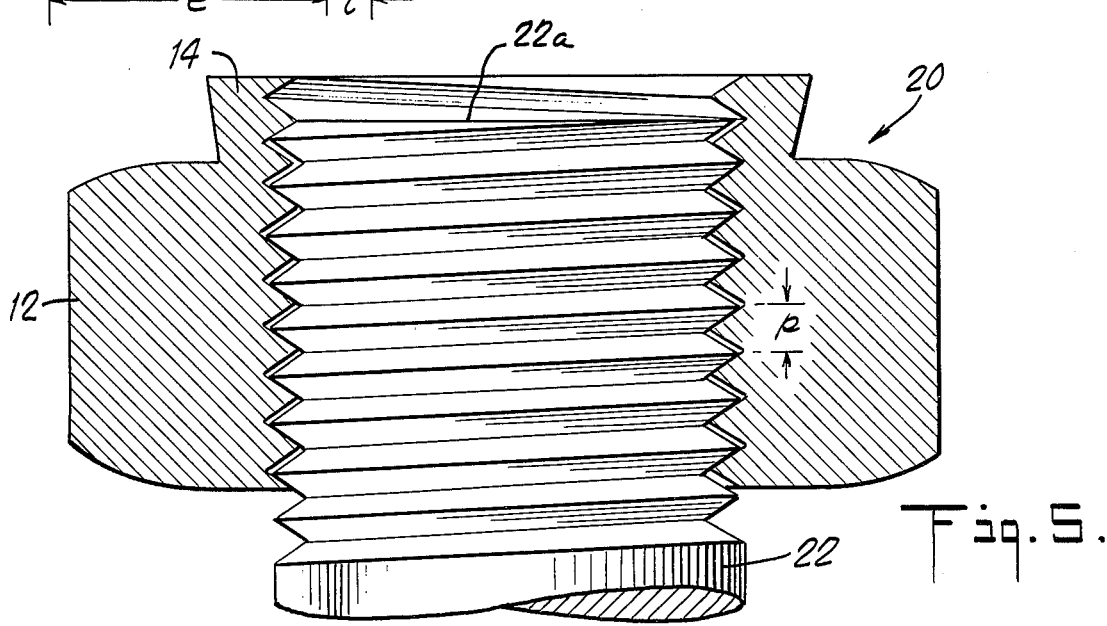
FIG. 5 is an enlarged cross-sectional view showing a screw engaging the lock nut of FIG. 4.

FIG. 5 shows a bolt 22 having a thread pitch $p$ equal to the uncompressed thread pitch $p$ in the body 12 of the nut 20. Bolt 22 is shown partially threaded into the lock nut 20. As the leading end 22a of the bolt engages the threads in the collar 14, the collar is stretched axially in tension, and the pitch of its threads is changed back toward the uncompressed pitch $p$. Frictional sliding engagement occurs between the collar threads and the bolt threads for at least one revolution of the bolt. Thus, at least one thread flight in the collar 14 enters into resilient contact with a corresponding thread flight of the bolt 22. Although more than one thread flight of the collar and the bolt may engage, it is essential at least one complete thread flight engages when the nut is seated in its final position on the bolt. If less than a complete thread were to be engaged, an undesirable side thrust might develop, with possible damage to the threads. The collar 14 is stressed in tension during this operation and the threads on the collar and on the bolt are stressed in a complex manner including both shear stress and bending stress. If the dimensional relationships described above are maintained, the stresses do not exceed either the elastic limit of the threads on the bolt and nut or the newly established (after the compression operation) elastic limit of the collar 14. Hence, after each insertion and removal of the bolt 22 from the nut 20, the collar 14 and the threads on the bolt and nut are resiliently self-restored to the contour existing before the insertion. Hence, the bolt 22 may be threaded into and out of the lock nut 20 many times, with the tightening and removal torques remaining substantially unchanged. This reusability is preferably aided by the use of a lubricant.

A series of tests were conducted with lock nuts 20 made in accordance with the invention. Nine samples, identified as A to I in the accompanying Table, are illustrative of the results of such tests in terms of tightening and removal torques. The table also shows the suggested Industry Standard covering "Locking Ability" for "Hexagon Locknuts, Prevailing Torque Type, Steel", as set forth in "Machine Design", (Fasteners Reference Issue), Mar. 11, 1965, (page 54, and Table 5).

TABLE

| Sample Identification | Dia. | Threads Per Inch | Cycle No. | Maximum Tightening Torque (lb.-in.) | Minimum Breakaway Torque (lb.-in.) | H Collar Wall Height As a Function of Pitch p | d Collar Wall Thickness As a Function of Thread Depth t | c Shortening of Collar In Inches An or as a Function of Pitch p |
|---|---|---|---|---|---|---|---|---|
| Industry Standard | ½" | | 1 | 150 | 22 | Conventional Nut | | |
| | | | 5 | | 15 | | | |
| SAMPLES A to G — CYLINDRICAL COLLAR | | | | | | | | |
| A | ½" | 13 | 1 | 100 | 90 | 3p | 1.0t | .017" |
| | | | 2 | 90 | 90 | | | (0.22p) |
| | | | 3 | 90 | 90 | | | |
| | | | 4 | 90 | 90 | | | |
| | | | 5 | 90 | 90 | | | |
| B | ½" | 13 | 1 | 140 | 130 | 2p | 1.0t | .031" |
| | | | 2 | 140 | 140 | | | (0.40p) |
| | | | 3 | 140 | 140 | | | |
| | | | 4 | 130 | 130 | | | |
| | | | 5 | 130 | 130 | | | |
| C | ½" | 13 | 1 | 130 | 130 | 2p | .75t | .015" |
| | | | 5 | 120 | 120 | | | (0.2p) |
| D | ½" | 13 | 1 | 120 | 100 | 2p | 1.25t | .009" |
| | | | 2 | 100 | 100 | | | (0.12p) |
| | | | 5 | 90 | 90 | | | |
| E | ½" | 13 | 1 | 90 | 80 | 2p | 1.50t | .017" |
| | | | 2 | 80 | 80 | | | (0.22p) |
| | | | 5 | 80 | 80 | | | |
| F | ½" | 13 | 1 | 120 | 100 | p | 1.0t | .028" |
| | | | 2 | 110 | 100 | | | (0.36p) |
| | | | 3 | 100 | 100 | | | |
| | | | 4 | 90 | 90 | | | |
| | | | 5 | 70 | 50 | | | |
| G | ½" | 20 | 1 | 80 | 80 | 2p | 0.75t | .019" |
| | | | 2 | 80 | 70 | | | (0.38p) |
| | | | 5 | 40 | 50 | | | |
| SAMPLE H — TAPERED COLLAR (Angle γ = 10°) | | | | | | | | |
| H | ½" | 13 | 1 | 120 | 110 | 2p | 1.0t | .008" |
| | | | 2 | 110 | 110 | | | (0.10p) |
| | | | 5 | 70 | 70 | | | |
| Industry Standard | ¼" | | 1 | 30 | 5 | Conventional Nut | | |
| | | | 5 | | 3.5 | | | |
| SAMPLE I — CYLINDRICAL COLLAR | | | | | | | | |
| I | ¼" | 20 | 1 | 35 | 29 | 2p | 1.0t | .017" |
| | | | 2 | 21 | 19 | | | (0.3p) |
| | | | 3 | 18 | 17 | | | |
| | | | 4 | 20 | 18 | | | |
| | | | 5 | 20 | 18 | | | |

The suggested Industry Standard indicates that it is acceptable to have the minimum breakaway torque about one-tenth of the initial tightening torque, after five cycles of insertion and removal.

By way of contrast, in the samples A to I, the minimum breakaway torque after five cycles, was over 40% of the maximum tightening torque in the poorest sample (G) and was over 90% in five of the samples (A to E). The effect on performance of the non-galling, elastic grip of the mating threads is evident, and it is furthermore evident that a lock nut far superior to the suggested industry standard is achieved by the present invention.

All the tests were made on commercial quality nuts and bolts.

FIGS. 6–8

These figures illustrate a modified form of nut blank 34, the process of making a nut from the blank, and the resulting nut 35. The nut blank 34 is provided with a conical recess in its upper surface, encircling a collar 36. The V-shaped recess shown is defined by a conical surface 34a in the upper end of the blank body, and by the cylindrical exterior surface 36a of collar 36. Alternatively, the recess may be U-shaped in cross-section. The nut blank 34 is provided with an internal thread 34b which is of constant pitch throughout the axial dimension of the nut blank. The collar 36 projects upwardly above an annular plane surface 34c at the upper periphery of the nut blank 34.

The shortening c of the collar 36 is produced by bringing a platen 37 having a plane under surface, down on the top of the collar 36 while the blank 34 is resting on an anvil 38. The force of the platen is controlled so that it compresses the collar 36, but does not compress the body of the nut blanks after the platen engages the surface 34c. The parts at the end of the compression stroke of the punch are shown in FIG. 7.

It may be seen that the surface 34c of the nut blanks serves as a limit stop for the down stroke of the platen, since the platen is wide enough to extend over the surface 34c. Note that the limit stop location is determined by the dimensions of the nut blank itself, and not by any dimension or setting of the machine. If desired, a projection may be formed on the platen so as to force the collar 36 down below the surface 34c of the nut blank 34. Alternatively, the platen may have a recess in its face, so that the collar is compressed by a shorter distance. Hence, the shortening of the collar 36 may be closely controlled by controlling its original length H and the dimensions of the platen. After the shortening operation is completed, and the compression is relieved, the lock nut 35 has the form shown in full lines in FIG. 8. As shown, the top of the collar 36 now lies above the plane with the surface 34c. Alternatively, the top of the collar may be above or below that plane, by the use of the alternative platen structures mentioned above, as long as the limitations stated in connection with FIGS. 1–5 as to the shortening c are observed.

As in the case of FIGS. 1–5, the same relations must be maintained between the collar wall thickness d and the thread depth t, and also between the collar height H and the thread pitch p.

It should be apparent from FIGS. 6 and 7 that the compression step may be carried out on a multiplicity of blanks 34 at the same time, by the use of a sufficiently large press platen.

I claim:
1. The method of making a lock nut, comprising the steps of:
   a. forming a blank including a relatively thick walled annular body and a relatively thin walled annular collar concentric with and integral with the body and projecting from one end thereof, said blank having a continuously threaded bore extending axially through both the body and the collar, the threads in said bore having a substantially constant pitch, said collar having a wall thickness not less than about three-fourths and not greater than about one and one-half times the thread depth, said collar also having an axial length between one and three times the thread pitch;
   b. compressing only the collar of said blank only axially, with the collar free of all lateral restraint except at its connection to the body, until the collar is stressed in compression beyond its elastic limit; and
   c. thereafter relieving the compression, said compressing and relieving steps cooperating to deform the collar by shortening it from about 0.1 to about 0.4 times the thread pitch, and by a tapered thickening of the collar so that its diameter decreases from its projecting end toward the body.

2. The method as defined in claim 1, including the steps of:
   a. forming in the end of the body adjacent the collar a recess concentric with the blank axis, said recess being separated from the periphery of the body by an annular, flat, radially extending surface;
   b. placing the blank between an anvil engaging the end of the body opposite the collar and a platen having a plane surface wider than the projecting end of the collar;
   c. moving the platen toward the anvil until said plane surface engages the projecting end with all lateral surfaces of the collar free of restraint; and
   d. continuing the movement of the platen toward the anvil until the platen also engages said flat surface on the blank, thereby compressing the collar by shortening its axial length by the difference between the axial length of the nut including the collar and the axial dimension of the body, while maintaining said freedom from lateral restraint.

3. The method of making a lock nut, comprising the steps of:
   a. forming a blank having plane end surfaces and including a relatively thick walled annular body and a relatively thin walled annular collar concentric with the body, said collar being connected integrally to one end of the body, and having its other end free, said blank having a continuously threaded bore extending axially through both the body and the collar, the threads in said bore having a substantially constant pitch, said body having in its end adjacent the collar a recess concentric with the blank axis, said recess being separated from the periphery of the body by an annular, plane, radially extending surface, said collar, when unstressed, projecting axially beyond the annular surface;
   b. placing the blank on an anvil with the plane end of the body on a plane surface of the anvil; and
   c. moving toward the anvil a platen with a plane surface having a lateral extent greater than that of the plane end surface of the free end of the collar so that the plane surface of the platen engages said free end and compresses the collar until the platen also engages said annular plane surface, thereby compressing only the collar of the blank only axially with all lateral surfaces of the collar free of lateral restraint, the axial dimension of the projecting collar being large enough so that the collar is stressed beyond its elastic limit when the platen engages the annular surface and is deformed by a shortening determined by said axial dimension and by a tapered thickening of the collar with the collar diameter decreasing from the projecting end toward the body.

4. The method of mass producing lock nuts, comprising the steps of:
   a. forming a plurality of blanks, each having plane end surfaces and including a relatively thick walled annular body and a relatively thin walled annular collar concentric with the body, said collar being connected integrally to one end of the body, and having its other end free, each said blank having a continuously threaded bore extending axially through both the body and the collar, the threads in said bore having a substantially constant pitch, said body having in its end adjacent the collar a recess concentric with the blank axis, said recess being separated from the periphery of the body by an annular, plane, radially extending surface, said collar, when unstressed, projecting axially beyond the annular surface;

b. placing the blanks on an anvil with the plane ends of the blank bodies on a plane surface of the anvil; and c. moving toward the anvil a platen having a plane surface having a lateral extent greater than that of the plane end surfaces of the free ends of the collars so that the plane surface of the platen engages said free ends and compresses the collars until the platen also engages said annular plane surfaces, thereby compressing only the collars of the blanks only axially with all lateral surfaces of the collars free of lateral restraint, the axial dimension of the projecting collars being large enough so that the collars are stressed beyond their elastic limit when the platen engages the annular surfaces and are deformed by a shortening determined by said axial dimension and by a tapered thickening of the collars, with the collar diameters decreasing from the projecting ends toward the bodies.

5. The method of making a lock nut, comprising the steps of:

a. forming a blank including a relatively thick walled annular body and a relatively thin walled annular collar concentric with the body, said collar projecting integrally from one end of the body to a free end of the collar, said blank having a continuously threaded bore extending axially through both the body and the collar, the threads in said bore having a substantially constant pitch; and b. compressing only the collar of said blank only axially, with the collar free of all lateral restraint, until the collar is stressed beyond its elastic limit and is permanently deformed by shortening and by a tapered thickening of the collar so that its diameter decreases from the projecting end toward the body.

* * * * *